M. CAHILL.
Sulky-Plow.
No. 218,856. Patented Aug. 26, 1879.
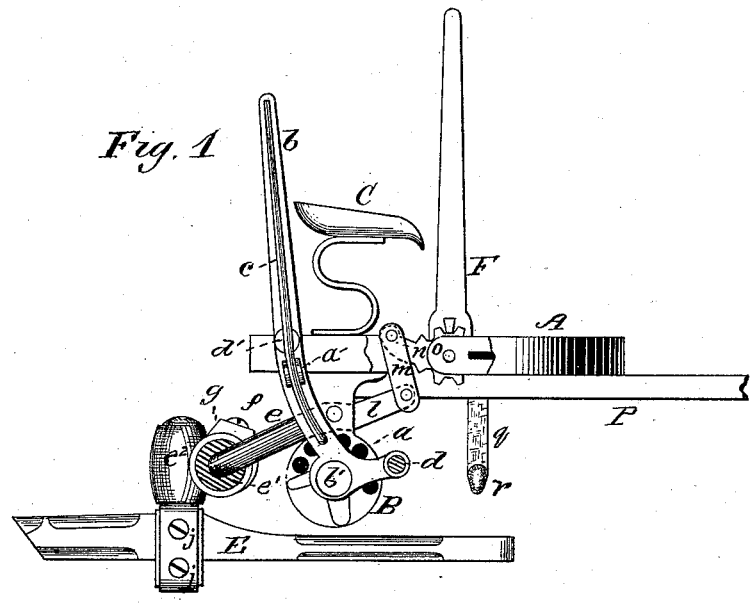
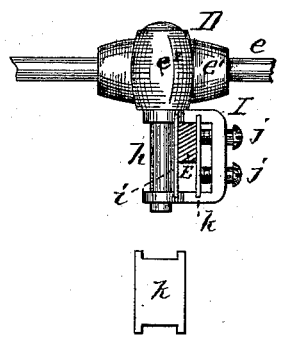
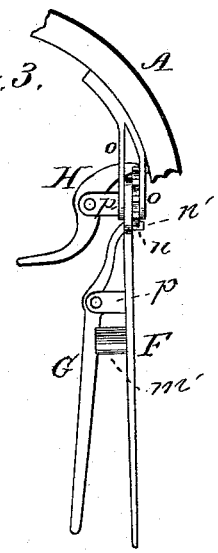
WITNESSES
William Daniels
Nat. E. Oliphant
INVENTOR
Mortimer Cahill,
per Chas. H. Fowler
Attorney.

UNITED STATES PATENT OFFICE.

MORTIMER CAHILL, OF STERLING, ILLINOIS.

IMPROVEMENT IN SULKY-PLOWS.

Specification forming part of Letters Patent No. 218,856, dated August 26, 1879; application filed December 9, 1878.

*To all whom it may concern:*

Be it known that I, MORTIMER CAHILL, of Sterling, in the county of Whiteside and State of Illinois, have invented a new and valuable Improvement in Sulky-Plows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of my invention; Figs. 2 and 3, detail views of the same.

This invention has relation to sulky or wheel plows; and it has for its object to construct the coupling that holds the plow-beam so that it will rigidly clamp and retain the same in position to admit of the plow drawing straight and readily following the line of draft, thereby cutting a furrow of a uniform width.

A further object of the invention is to present a device simple in construction by which means the plow or plow-beam can be adjusted in either direction laterally, and also has a circular motion, thereby making it adjustable to different widths of cut, and the depth of the plow regulated or changed.

A further object of the invention is to simplify the general construction of the several operating parts of the plow and render it readily and easily controlled by the driver, as will be hereinafter described, and subsequently pointed out in the claims.

In the accompanying drawings, A represents the frame of the plow, which may be of any suitable form or construction; but in this instance I have shown it as semicircular.

From the sides of the frame A, projecting in a downward direction, are circular plates B, formed with a series of holes, $a$, extending partially around the periphery thereof.

A lever, $b$, is secured to each of the plates B by suitable bolts $b'$, passing through them and through angle-irons or brace-rods, the upper ends of said rods being bolted or otherwise rigidly secured to the under side of the frame A.

The levers $b$ are formed with ears or lugs $a'$, to receive pivotal levers $c$, formed at their lower ends with dogs to engage with the holes $a$ in the circular plates B, and held automatically therein by a suitable spring, $d'$, interposed between the levers $b$ $c$, as illustrated in Fig. 1 of the drawings. This construction, when the dogs are disengaged with the holes in the circular plates, will admit of the levers being turned either to the right or left the desired distance, and automatically held by the dogs engaging with the holes in the circular plates through the agency of the springs $d'$.

The levers $b$, at their lower ends, are extended horizontally or at right angles thereto, to form axles $d$, to which are secured the wheels of the plow.

The construction as above described enables the operator to gage the plow to any desired depth, or to raise the same when not in use and for transportation.

A seat, C, of any suitable form, is secured to the frame A in any well-known manner.

Under the frame A, and to the upper ends of the circular plates B, is pivoted a crank or bail, $e$, which passes through the horizontal section $e^1$ of a clamp, D, which is held at any desired distance from either end of the crank or bail $e$ by a set-screw, $f$, passing through a collar, $g$, thereby making the plow adjustable to the various sizes or widths of cut.

The clamp D is formed with an eye or sleeve, $e^2$, through which loosely passes a bolt, $h$.

Through the angle-iron I passes the lower end of the bolt $h$; or said angle-iron may be otherwise rigidly secured thereto. This angle-iron I is designed to receive the plow-beam E, which is firmly held within the same against a stationary plate, $i$, by set-screws $j$, forcing and holding against the opposite side of the beam a plate, $k$. This plate is recessed upon its opposite ends, so as to fit and slide longitudinally upon the angle-iron I.

The means shown and described of clamping the plow-beam and firmly holding it insures the same from working loose, and beams of any width and thickness can be as easily and effectually clamped and held within the angle-iron.

The clamp D, which I have preferred to term it, consists, as has been previously stated, in the horizontal sleeve or section $e^1$ and vertical sleeve $e^2$. It has been found essential and important that such device should be simple in construction, and as strong and durable as possible, on account of the strain and wear it is subjected to; also, in lessening its cost as far as possible.

The section $e^1$ and sleeve $e^2$ are therefore cast together or from the same piece of metal, thereby securing in the clamp cheapness, strength, and durability, and producing a device that will serve the purposes required.

The collar $g$ is independent of the section $e^1$, said section being cast with a recess to admit of the collar being on line with the section $e^1$, and located on the crank $e$, between the ends thereof. The collar $g$ is made thicker upon one of its sides, and has a screw-threaded opening extending through it to receive a set-screw, $f$, by which the clamp D is held upon the crank $e$ at the required distance.

The plow-beam E abuts against a T-shaped iron, $g$, as will be hereinafter more fully described.

One end of the crank $e$ has a curved arm, $l$, extending beyond the pivotal point thereof, and has pivoted a link, $m$, formed of two parallel plates, between which the arm $l$ is secured, the opposite end of the link being pivoted to a ratchet-wheel, $n$, the same being held between two parallel plates, $o$, and adapted to rotate upon its axis.

A lever, F, is also disposed or pivoted between the plates $o$, upon the inner side of the ratchet-wheel, and is moved independent of the same.

A spring-rod, G, is pivoted between lugs or ears $p$, secured to the lever F, said rod, upon its lower end, having a dog, $n'$, to engage with the teeth upon the ratchet-wheel $n$, said dog being automatically held in place by a spring, $m'$, interposed between the rod G and lever F.

A pivoted stop, H, is secured between lugs $p'$, the latter being rigidly secured to the plates $o$. The stop H engages with the teeth upon the ratchet-wheel to lock it at the required position, and thus prevent the plow from rising out of the ground. The stop is limited in its movement by passing through elongated slots in the plates $o$.

From the tongue P, or from the frame A, as previously stated, is a stationary T-shaped plate or rod, $q$. This rod, upon the horizontal part thereof, is formed with fingers $r$, so that not only the plow-beam is limited in its vertical movement, but also in its sidewise or lateral motion.

Having now fully described my invention, what I claim as new, and desire to secure by Letters Patent, is—

1. The clamp D, capable of lateral adjustment upon the crank $e$, said clamp having the horizontal section $e^1$ and vertical sleeve $e^2$, collar $g$, and set-screw $f$, in combination with a clamping device for holding the plow-beam secured to a bolt passing through the vertical sleeve $e^2$, substantially as and for the purpose described.

2. The ratchet-wheel $n$, connected to the pivotal horizontal crank $e$ by link $m$, working in combination with lever F, slotted plates $o$, and stop H, all constructed to operate substantially as and for the purpose set forth.

3. The combination, with the clamp D, formed with horizontal section $e^1$, vertical sleeve $e^2$, and the collar $g$, with set-screw $f$, of the pivotal bolt $h$, angle-iron I, plates $i$ $k$, and set-screws $j$, substantially as and for the purpose set forth.

In testimony that I claim the above I have hereunto subscribed my name in the presence of two witnesses.

MORTIMER CAHILL.

Witnesses:
MILTON CROSS,
GEORGE SIMMONDS.